United States Patent [19]

Ammons

[11] 4,131,605
[45] Dec. 26, 1978

[54] POLY(ETHER)URETHANE CURABLE AT AMBIENT TEMPERATURE USING BUTYLSTANNOIC ACID CATALYST

[75] Inventor: Vernon G. Ammons, Glenshaw, Pa.

[73] Assignee: PPG Industries, Inc., Pittsburgh, Pa.

[21] Appl. No.: 866,437

[22] Filed: Jan. 3, 1978

[51] Int. Cl.$^2$ ............................................. C08G 18/24
[52] U.S. Cl. .................................... 528/77; 260/823
[58] Field of Search ............... 260/77.5 AB, 2.5 AB, 260/75 NB, 77.5 AN; 428/425

[56] References Cited

U.S. PATENT DOCUMENTS

| | | | |
|---|---|---|---|
| 3,060,137 | 1/1962 | Gemeinhardt et al. | 260/75 NB |
| 3,194,770 | 7/1965 | Hostettler | 260/2.5 AB |
| 3,194,773 | 7/1965 | Hostettler | 260/2.5 AB |
| 3,509,015 | 4/1970 | Wismer et al. | 260/77.5 AM |
| 3,620,905 | 11/1971 | Ahramjian | 260/77.5 AM |
| 3,764,457 | 10/1973 | Chang et al. | 260/77.5 AP |
| 3,900,446 | 8/1975 | McClung et al. | 260/77.5 AT |
| 3,900,655 | 8/1975 | Wolgemuth et al. | 428/214 |
| 3,931,113 | 1/1976 | Seeger et al. | 260/77.5 AN |
| 4,024,113 | 5/1977 | Ammons | 260/77.5 AM |
| 4,035,548 | 7/1977 | Chang et al. | 260/77.5 AN |

*Primary Examiner*—M. J. Welsh
*Attorney, Agent, or Firm*—Donna L. Seidel

[57] ABSTRACT

A transparent, elastomeric polyurethane which may be cast and cured in place at ambient temperature is prepared by the reaction of a cycloaliphatic diisocyanate with a polyalkylene ether glycol and a crosslinking agent in the presence of butyl stannoic acid catalyst.

15 Claims, No Drawings

POLY(ETHER)URETHANE CURABLE AT AMBIENT TEMPERATURE USING BUTYLSTANNOIC ACID CATALYST

BACKGROUND OF THE INVENTION

The present invention relates to polyurethane reaction mixtures which can be cast and cured in place at ambient temperature thereby eliminating the problem of warpage, caused by differences in coefficients of thermal expansion, which occurs during high temperature fabrication of glass-plastic laminates.

SUMMARY OF THE INVENTION

The present invention involves a room temperature curable polyurethane prepared by the reaction of a cycloaliphatic diisocyanate with a polyalkylene ether glycol and a crosslinking agent in the presence of butyl stannoic acid catalyst. The reaction mixture has a sufficiently long pot life at ambient temperature and a sufficiently low viscosity to permit casting into sheet molds by gravity feed alone. The reaction mixture may be partially cured in place to a readily handleable stage and then further processed or may be fully cured in place at ambient temperature. The fully cured polyurethane is colorless, transparent, tough and elastomeric.

According to the present invention, a cycloaliphatic diisocyanate is reacted with a substantially equivalent amount of a polyalkylene ether glycol and a crosslinking agent which contains three hydroxyl groups capable of reacting with isocyanato groups. The catalyst for the reaction is butyl stannoic acid. The liquid reaction mixture is cast into a sheet mold and cured at ambient temperature. The polyurethane is handleable in sheet form after a partial cure of about 24 hours and is fully cured in about two weeks at ambient temperature, typically 70 to 75° F. (about 21 to 24° C.).

DETAILED DESCRIPTION OF THE PREFERRED EMBODIMENT

A room temperature curable aliphatic polyurethane is prepared by the reaction of a mixture of polyalkylene ether glycol and a triol with a substantially equivalent amount of an aliphatic diisocyanate, preferably a cycloaliphatic diisocyanate. The trifunctional polyol provides crosslinking sites in the polyurethane. The reaction is catalyzed by butyl stannoic acid.

Polyalkylene ether glycols useful in the present invention have a general formula of:

wherein R is an alkylene containing from about 2 to about 6 methylene groups, preferably tetramethylene, and x is in a range such that the molecular weight of the polyalkylene ether glycol is from about 600 to about 1,000. Preferred polyalkylene ether glycols are either liquid at ambient temperature or melt at slightly elevated temperatures and remain liquified in the reaction mixture at room temperature.

Crosslinking agents useful in the present invention include trifunctional compounds such as trimethylolpropane and polyesterr triols, particularly polycaprolactone triols, preferably those having molecular weights in the range of 300 to 1,000. The trifunctional compound is incorporated into the reaction mixture to provide crosslinking sites in the polyurethane. Sufficient triol is added to provide the polyurethane with a molecular weight between branch points of about 900 to 4,000.

Preferred aliphatic diisocyanates include 1,4-cyclohexyl diisocyanate; 4,4'-isopropylidene-bis-(cyclohexyl isocyanate); and other dinuclear cycloaliphatic diisocyanates formed through an alkylidene bridging group of from 1 to 3 carbon atoms which can be ring substituted with nitro, chloro, alkyl, alkoxy and other groups; and preferably are liquid at room temperature. The most preferred aliphatic diisocyanate is 4,4'-methylene-bis-(cyclohexyl isocyanate), preferably having 55 percent trans and 45 percent cis isocyanato groups. Polyurethanes prepared from these isocyanates have high impact resistance over a wide temperature range and are not adversely affected by ultraviolet light.

In general, catalysts which provide long pot life at ambient temperature require high temperatures for full cure while catalysts which provide full cure at ambient temperature result in extremely short pot life. According to the present invention, butyl stannoic acid is used as the catalyst. Butyl stannoic acid provides the reaction mixture with a relatively long pot life at ambient temperature, typically on the order of several hours, while at the same time promoting full cure of the polymer at ambient temperature, about 70 to 75° F. (about 21 to 24° C.). The butyl stannoic acid catalyst of the present invention is preferably incorporated in the reaction mixture as a dilute solution in a polylactone diol, preferably about 1 percent solution in a polycaprolactone diol of molecular weight about 950 to 1050. The catalyst concentration in the reaction mixture is sufficient to provide a substantially complete cure at ambient temperature in a reasonable period of time and is generally in the range of 500 to 1000 parts per million.

The polyalkylene ether glycol, aliphatic diisocyanate, crosslinking agent and butyl stannoic acid catalyst are mixed together to yield a transparent, homogeneous liquid at ambient temperature of sufficiently low viscosity that casting into a sheet mold is possible by gravity feed alone at ambient temperature. The liquid reaction mixture, which remains castable for several hours, is cast into a sheet mold preferably comprising sheets of glass and/or plastic. The cast material cures in place at ambient temperature. The polymer can be partially cured in about 24 hours to an easily handleable state and further processed or the polymer may be fully cured in place in about two weeks.

In a particularly preferred embodiment of the present invention, the reaction mixture is cast between a glass sheet and a rigid transparent sheet of plastic such as polycarbonate. The polyurethane cures in place at ambient temperature to form a transparent, energy-absorbing interlayer, typically 40 to 100 mils (about 1 to 2.5 millimeters) thick between the two rigid sheets in a laminated product.

The present invention will be more fully understood from the description of specific examples which follow.

EXAMPLE I

The following components are mixed together to yield a colorless, transparent, homogeneous, low-viscosity liquid reaction mixture at ambient temperature and pressure:

| Component | Equivalents | Weight % |
|---|---|---|
| 4,4'-methylene-bis-(cyclohexyl isocyanate) | 1.000 | 27.30 |

-continued

| Component | Equivalents | Weight % |
|---|---|---|
| polytetramethylene ether glycol | 0.552 | 56.49 |
| polycaprolactone triol | 0.369 | 7.89 |
| butyl stannoic acid catalyst solution | 0.079 | 8.32 |

The isocyanate component is commercially available as Hylene W from duPont. The polytetramethylene ether glycol has a molecular weight of about 1000 and is supplied by Quaker Oats. The polycaprolactone triol of this example has a molecular weight of about 300 and is available as PCP-0301 from Union Carbide. The catalyst solution is 1 percent by weight butyl stannoic acid in a polycaprolactone diol of molecular weight about 1000. The liquid reaction mixture is cast into a sheet mold between a glass sheet and a rigid polycarbonate sheet in parallel facing relationship at a spacing of about 40 mils (about 1 millimeter). After about 24 hours at room temperature, about 70 to 75° F. (about 21 to 24° C.), the glass/polyurethane/polycarbonate composite is handleable and may be further processed. The polyurethane is completely cured after about two weeks at ambient temperature, and the composite suffers no warpage from exposure to high temperatures such as required by autoclave lamination techniques. The finished product is useful as an aircraft transparency.

EXAMPLE II

The following reaction mixture is prepared, cast and cured as in Example I.

| Component | Equivalents | Weight % |
|---|---|---|
| 4,4'-methylene-bis-(cyclohexyl isocyanate) | 1.000 | 26.96 |
| polytetramethylene ether glycol | 0.543 | 56.96 |
| polycaprolactone triol | 0.377 | 7.76 |
| butyl stannoic acid catalyst solution | 0.080 | 8.32 |

The components are as described in Example I. The cured polyurethane has a molecular weight between branch points of about 2550.

The above examples are offered only to illustrate the present invention which is not limited to these specific embodiments. Variations and modifications are included within the spirit of the invention. For example, adhesion control agents may be included in the polymer formulation as disclosed in U.S. Pat. Nos. 3,791,914 and 3,900,686 which disclosures are incorporated herein by reference. The scope of the present invention is defined by the following claims.

I claim:
1. An ambient temperature curable polyurethane composition prepared by the reaction of:
 a. an aliphatic diisocyanate;
 b. a polyalkylene ether glycol;
 c. a compound comprising three hydroxyl groups capable of reacting with isocyanato groups; and
 d. butyl stannoic acid catalyst.
2. The polyurethane composition according to claim 1, wherein compound (c) is a polyester triol.
3. The polyurethane composition according to claim 2, wherein the aliphatic diisocyanate is a cycloaliphatic diisocyanate.
4. The polyurethane composition according to claim 3, wherein the cycloaliphatic diisocyanate is 4,4'-methylene-bis-(cyclohexyl isocyanate).
5. The polyurethane composition according to claim 2, wherein the polyalkylene ether glycol is polytetramethylene ether glycol.
6. The polyurethane composition according to claim 5, wherein the polyalkylene ether glycol has a molecular weight between about 600 and about 1000.
7. The polyurethane composition according to claim 2, wherein the polyester triol is a polycaprolactone triol.
8. The polyurethane composition according to claim 7, wherein the polycaprolactone triol has a molecular weight between about 300 and 1000.
9. A method for making a composite sheet structure which comprises an ambient temperature curable polyurethane interlayer comprising the steps of:
 a. casting into a sheet mold a liquid reaction mixture which comprises:
  (1) an aliphatic diisocyanate;
  (2) a polyalkylene ether glycol;
  (3) a compound comprising three hydroxyl groups capable of reacting with isocyanato groups; and
  (4) butyl stannoic acid catalyst; and
 b. curing the reaction mixture in place at ambient temperature.
10. The method according to claim 9, wherein compound (3) is a polyester triol.
11. The method according to claim 10, wherein the aliphatic diisocyanate is 4,4'-methylene-bis-(cyclohexyl isocyanate).
12. The method according to claim 10, wherein the polyalkylene ether glycol is polytetramethylene ether glycol of molecular weight between about 600 and about 1000.
13. The method according to claim 10, wherein the polyester triol is a polycaprolactone triol of molecular weight between about 300 and about 1000.
14. The method according to claim 10, wherein the concentration of butyl stannoic acid catalyst in the reaction mixture is between about 500 and about 1000 parts per million.
15. The method according to claim 14, wherein the polyurethane is fully cured at ambient temperature in about two weeks.

* * * * *